Jan. 30, 1934. M. H. LEWIS 1,945,323
SURVEYING INSTRUMENT
Filed July 1, 1930 2 Sheets-Sheet 1
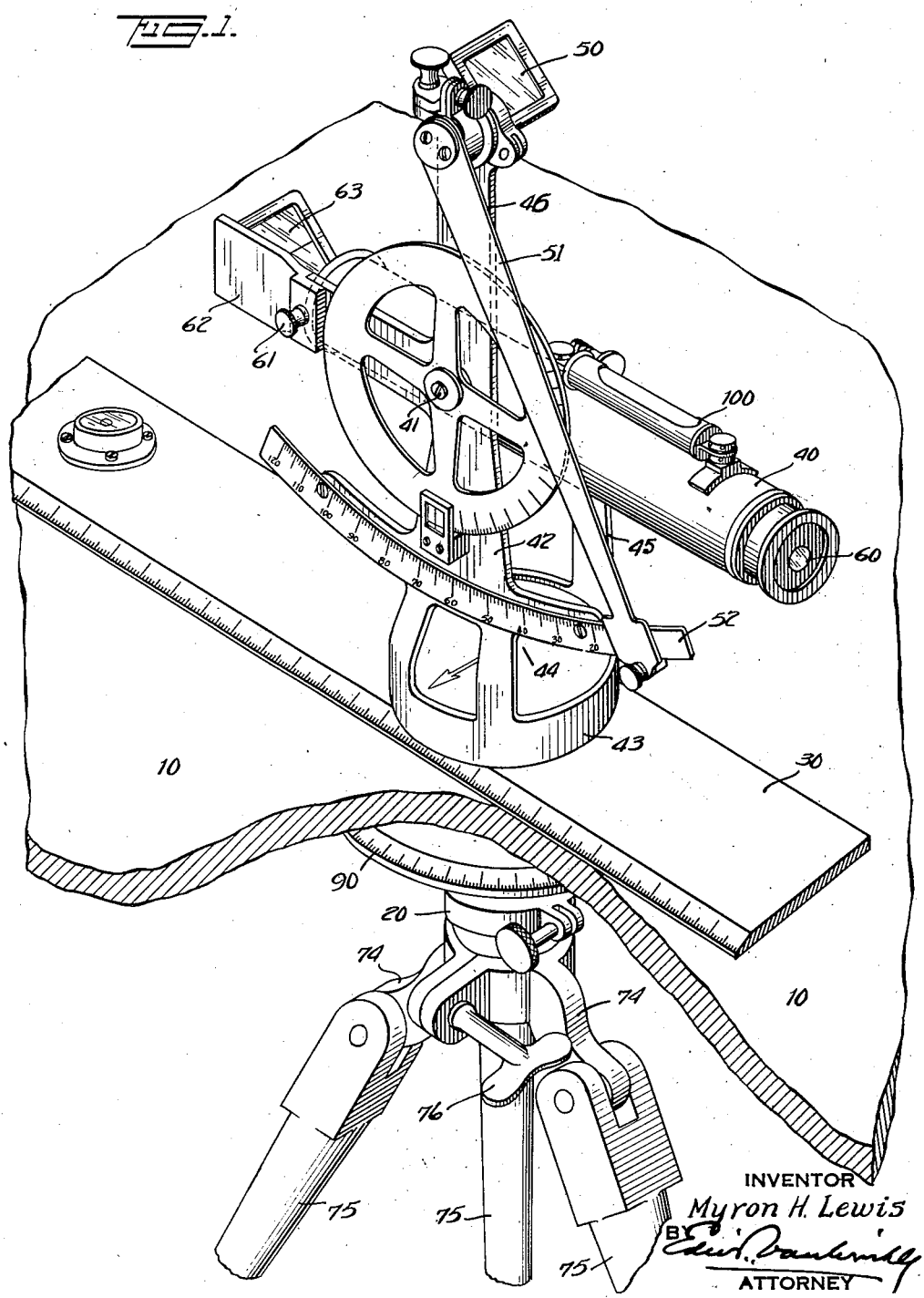

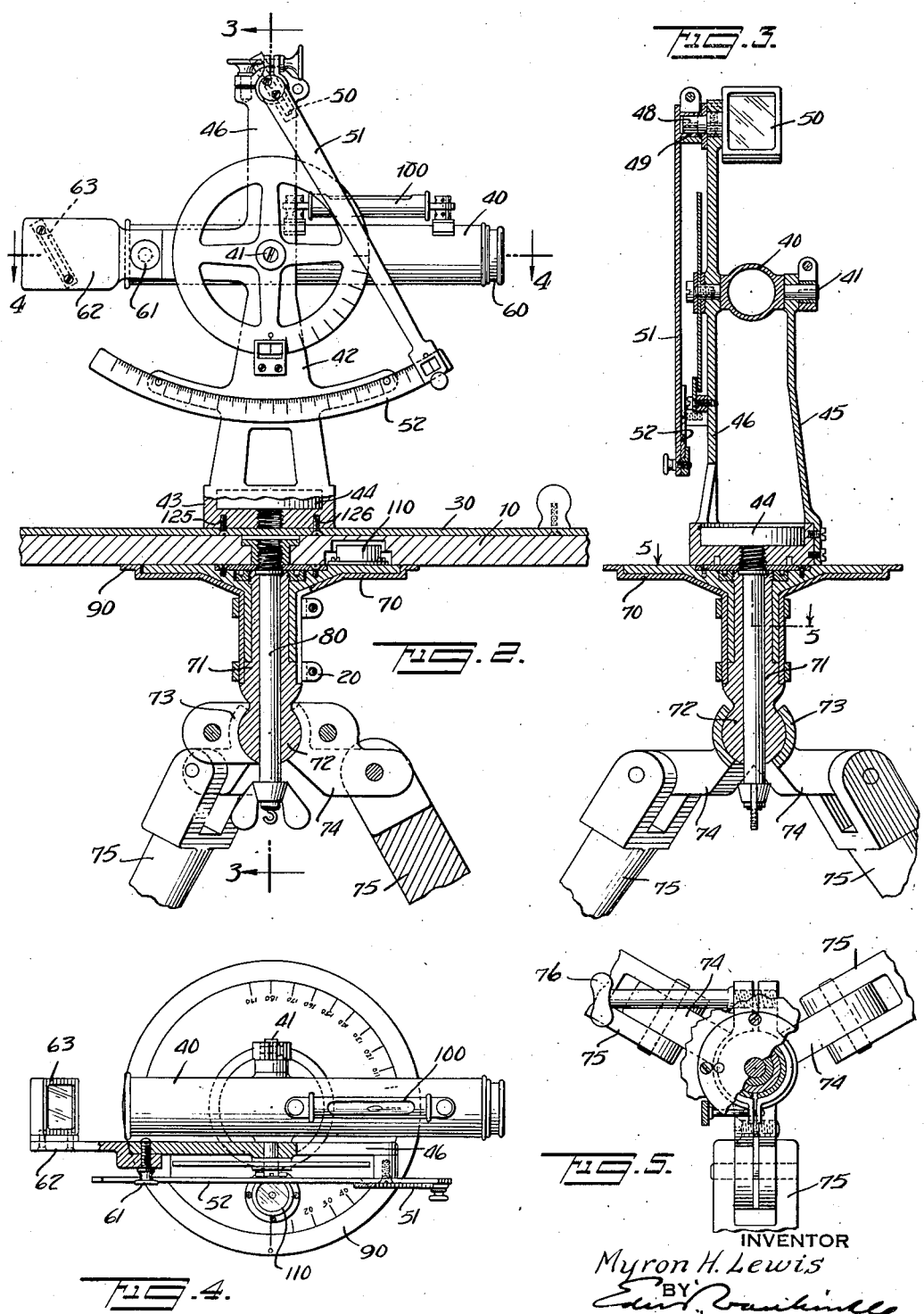

Patented Jan. 30, 1934

1,945,323

UNITED STATES PATENT OFFICE 1,945,323

SURVEYING INSTRUMENT

Myron H. Lewis, New York, N. Y.

Application July 1, 1930. Serial No. 465,107

4 Claims. (Cl. 33—67)

The invention relates to surveying instruments and more particularly to a unit that combines the functions of a transit, a level, a plane table and a sextant, and has for its object the production of a light and inexpensive instrument which is adapted for educational and instructive purposes and yet is accurate enough for preliminary surveys, topographical details and the determination of latitude and longitude, meridians, line leveling and cross-sections and other work usually performed by the use of the four scientific instruments mentioned above.

At the present time the plane table as used by engineers and surveyors, is an instrument by itself. It is used for making maps directly in the field. The transit is a separate instrument used for accurate determination of lines and angles. It may be used for leveling but for accurate work a separate level is used. The sextant is an instrument used to determine the elevation of heavenly bodies and to read angles between visible objects, locate soundings etc. My instrument combines the various features of these four instruments in a novel way. This result is effected by combining the alidade of the plane table with a reversible telescope the standard of which is removable from the ruling part. The table is removable from the tripod and the tripod is adapted to receive the telescope and its standard which is interchangeable with the plane table. On the axis of the telescope is mounted an index mirror and, in the same plane with the eye piece of the telescope, is mounted a horizon mirror, which two mirrors, together with a movable arm and graduated arc mounted on the standard, form a sextant combination. The mirrors and arm are removable.

The foregoing and other features of my invention will now be described in connection with the accompanying drawings forming part of this application in which I have represented my surveying instrument in its preferred form after which I shall point out in the claims those features which I believe to be new and to constitute my invention.

In the drawings:

Figure 1 is a perspective view of my surveying instrument.

Figure 2 is a side view in part section of same.

Figure 3 is a section along the line 3—3, Figure 2.

Figure 4 is a top view, and

Figure 5 is a top view of the tripod support in part section along the line 5—5, Figure 3.

In the carrying out of my invention I employ a plane table 10 mounted for support on a tripod 75. An alidade 30 is detachably fastened, by screws 125, 126 to the base 43 of a standard 42, in which a telescope 40 is mounted on a horizontal axis 41. Standard 42 comprises a base 43 and a compass 44. This base is provided with two uprights 45 and 46 which carry the bearings for the horizontal axis 41 of the reversible telescope 40. On the upper end of upright 45 I provide means for clamping the trunnion of the telescope in adjusted position. On the upper end of upright 46 I provide a bearing 48 in which is mounted a stud 49 carrying an index mirror 50. This mirror is located in the vertical plane of the horizontal axis of the telescope. On the end of the stud 49 opposite the mirror I provide a movable arm 51 which is adapted to swing along a graduated arc 52 mounted on the upright 46.

On the end of the telescope away from the eye piece 60, I provide a set screw 61 adapted to hold into adjusted position a frame 62 which supports a horizon mirror 63 in the same plane with the eye piece 60 of the telescope. These two mirrors, together with the movable arm and graduated arc, form a sextant combination and may be removed from the tripod and held in the hands and used as a sextant.

The tripod head 70 is supported upon a hollow stud 71 terminating in a ball finial 72 which is clamped within a cup 73 adapted for the purpose, by means of a set screw. The clamping cup is provided with three arms 74 which form supports for the three legs 75 of the tripod. The stud is hollow permitting the screw pin 80 to pass therethrough and clamp either the plane table or the alidade standard to the tripod head. Under the head of said pin I provide a hook for the plumb line.

The vernier plate 90 is carried directly upon the tripod head.

On top of the telescope 40 I provide a level 100.

The tripod 20 may be clamped firmly in position by means of the screw 76 and is provided with a leveling device 110 and a horizontal graduated arc 90 for reading of horizontal angles when in use as a transit. When used as a plane table the telescope unit is attached to the ruler, by means of two small screws 125, and 126, which screw into the under side of the base 43 through the ruler. These screws are used for attaching or detaching the ruler. The table 10 is screwed on the tripod by means of the screw-threaded pin 80.

To use my instrument as a transit, the table is removed from the tripod, the ruler is removed from the standard and the standard is screwed on the tripod and clamped tight, as shown in Figure 3.

I wish it to be distinctly understood that the instrument herein illustrated and described is the preferred form, but that changes or variations may be made, as may be convenient or desirable, without departing from the salient features of my invention, and I therefore intend the following claims to cover such modifications as naturally fall within the scope of my invention.

I claim:

1. In a surveying instrument, the combination of a plane table, a tripod, a hollow stud mounted in said tripod, a vernier plate having a depending sleeve surrounding said stud, means to clamp said sleeve on said stud, an alidade standard, a ruler detachably secured to the base of said standard and adapted to rest on said table, a screw pin passed through said hollow stud, said table and said base each having a threaded hole to receive said pin alternatively, a telescope pivoted in said standard, a horizon mirror in the plane of the telescope eyepiece, an index mirror directly over the pivot of the telescope, a swinging arm connected to said index mirror, and a graduated arc on said standard over which said arm plays, whereby the instrument can be used as a transit, a plane table, or a sextant.

2. A surveying instrument combining the functions of a transit, a level, a plane table and a sextant, comprising a tripod, a plane table, means detachably mounting said table on the tripod, a standard adapted to be mounted on said table, a reversible telescope horizontally pivoted in said standard, the latter being adapted to be mounted directly on said means after said table has been removed, an upward extension on said standard, a mirror pivoted in said extension, an indicator arm secured to said mirror, a graduated arc on said standard over which said arm plays, a horizon mirror on the objective end of said telescope, said means including a hollow stud universally mounted in said tripod, and a screw pin in said stud adapted to selectively engage said table or standard, whereby either the table or the standard can be secured to the tripod.

3. A surveying instrument combining the functions of a transit, a plane table and a sextant, comprising a tripod, a plane table detachably mounted thereon, an alidade standard adapted to rest on said table, a horizontally pivoted telescope reversibly carried by said standard, a ruler attached to the base of said standard and adapted to rest on said table, a mirror detachably fixed on the objective end of said telescope, a second mirror pivoted on the upper end of said standard in the vertical plane of the pivot axis of the telescope, an index arm carried by said second mirror, a graduated arc on said standard over which said arm plays, and means whereby said standard can be directly secured to said tripod when the table is removed.

4. In a surveying instrument, a plane table, an alidade standard formed to rest thereon, a telescope pivoted on a horizontal axis in said standard, a ruler detachably fixed to said standard to rest on said table, a mirror detachably fixed to the objective end of said telescope in line with the optical axis thereof, said standard having a portion projecting upwardly a substantial distance above said axis, a second mirror pivoted in said standard portion on a horizontal axis, an index arm fixed to said second mirror, a graduated arc secured to said standard to cooperate with said arm, a base, and means on said base adapted to engage selectively with said table or said standard, whereby the latter can be mounted upon the base independently of the table.

MYRON H. LEWIS.